United States Patent
Watanabe et al.

(10) Patent No.: US 9,886,022 B2
(45) Date of Patent: Feb. 6, 2018

(54) NUMERICAL CONTROL DEVICE

(71) Applicants: Mitsubishi Electric Corporation, Tokyo (JP); CITIZEN HOLDINGS CO., LTD., Tokyo (JP); CITIZEN MACHINERY CO., LTD., Nagano (JP)

(72) Inventors: Mitsuo Watanabe, Tokyo (JP); Masakazu Sagasaki, Tokyo (JP); Yuki Hirata, Aichi (JP); Hitoshi Matsumoto, Nagano (JP)

(73) Assignees: Mitsubishi Electric Corporation, Chiyoda-ku, Tokyo (JP); CITIZEN WATCH CO., LTD., Nishitokyo-Shi, Tokyo (JP); CITIZEN MACHINERY CO., LTD., Kitasaku-gun, Nagano (JP)

( * ) Notice: Subject to any disclaimer, the term of this patent is extended or adjusted under 35 U.S.C. 154(b) by 258 days.

(21) Appl. No.: 14/649,992

(22) PCT Filed: Apr. 23, 2014

(86) PCT No.: PCT/JP2014/061488
§ 371 (c)(1),
(2) Date: Jun. 5, 2015

(87) PCT Pub. No.: WO2015/162739
PCT Pub. Date: Oct. 29, 2015

(65) Prior Publication Data
US 2016/0266567 A1 Sep. 15, 2016

(51) Int. Cl.
*G05B 19/19* (2006.01)
*B23Q 15/013* (2006.01)
(Continued)

(52) U.S. Cl.
CPC .......... *G05B 19/19* (2013.01); *B23Q 15/013* (2013.01); *G05B 19/4093* (2013.01);
(Continued)

(58) Field of Classification Search
CPC .................. G05B 19/19; G05B 19/4093; G05B 19/4103; G05B 2219/36204;
(Continued)

(56) References Cited

U.S. PATENT DOCUMENTS 5,396,434 A 3/1995 Oyama et al.
5,911,802 A 6/1999 Kimura et al.
(Continued)

FOREIGN PATENT DOCUMENTS

AU 2003215876 A1 10/2003
JP 62-140702 A 6/1987
(Continued)

OTHER PUBLICATIONS

Written Opinion of the International Searching Authority for PCT/JP2014/061488 dated Jul. 15, 2014. [PCT/ISA/237].
(Continued)

*Primary Examiner* — Robert Fennema
*Assistant Examiner* — Jigneshkumar Patel
(74) *Attorney, Agent, or Firm* — Sughrue Mion, PLLC; Richard C. Turner

(57) ABSTRACT

A numerical control device includes a phase-difference calculation unit that, when machining with vibrations is performed on a movement path, calculates a phase difference between a vibrational forward-moving position and a vibrational backward-moving position from a vibration amplitude-to-feed ratio between amplitude of the vibrations and a feed speed of a tool to a workpiece, a movement-path generation unit generating the vibrational forward-moving position and the vibrational backward-moving position as
(Continued)

the movement path for each drive shaft by using the phase difference, a vibration-waveform generation unit generating a reference vibration waveform to be superimposed on the movement path for each drive shaft by using vibration conditions, a vibrational-movement-amount generation unit calculating a vibrational-movement amount on the movement path for each drive shaft by using the reference vibration waveform, and a movement-amount combining unit generating a combined movement amount for each drive shaft by adding the vibrational-movement amount to the movement path.

8 Claims, 12 Drawing Sheets

(51) Int. Cl.
 *G05B 19/4093* (2006.01)
 *G05B 19/4103* (2006.01)
(52) U.S. Cl.
 CPC .............. *G05B 19/4103* (2013.01); *G05B 2219/36204* (2013.01); *G05B 2219/49384* (2013.01); *G05B 2219/50047* (2013.01); *G05B 2219/50049* (2013.01)
(58) Field of Classification Search
 CPC ........... G05B 2219/49384; G05B 2219/50047; G05B 2219/50049; B23Q 15/013
 USPC .......................................................... 700/114
 See application file for complete search history.

(56) References Cited

U.S. PATENT DOCUMENTS

| 2012/0232812 A1* | 9/2012 | Okita | B23Q 17/0976 |
| | | | 702/56 |
| 2013/0046405 A1* | 2/2013 | Shamoto | G05B 19/404 |
| | | | 700/190 |
| 2013/0226355 A1* | 8/2013 | Ueno | G05B 19/18 |
| | | | 700/280 |
| 2014/0102268 A1 | 4/2014 | Hariki et al. | |

FOREIGN PATENT DOCUMENTS

| JP | 1-255006 A | 10/1989 |
| JP | 5-173619 A | 7/1993 |
| JP | 10-15701 A | 1/1998 |
| JP | 10-43901 A | 2/1998 |
| JP | 2009-190119 A | 8/2009 |
| JP | 5033929 B1 | 9/2012 |
| JP | 5139591 B1 | 2/2013 |
| JP | 5139592 B1 | 2/2013 |
| WO | 03/086688 A1 | 10/2003 |

OTHER PUBLICATIONS

International Search Report for PCT/JP2014/061488 dated Jul. 15, 2014.

* cited by examiner (a)

```
:
N01 G0 X0.0;
N02 G165 P1;              (START OF VIBRATION-CUTTING CONTROL MODE)
N03 G99 G1 X10.0 F0.05;   (CUTTING FEED COMMAND 0.05 mm/r)
N04 X20.0 F0.10;          (CUTTING FEED COMMAND 0.10 mm/r)
N05 G165 P0;              (END OF VIBRATION-CUTTING CONTROL MODE)
:
```
~432

(b)

"AMPLITUDE-TO-FEED RATIO" PARAMETER SET VALUE: 2.0 ~4311

FIG.7

```
:
N01 G0 X0.0;
N02 G165 P1 Q2.0;        (START OF VIBRATION-CUTTING CONTROL MODE AND VIBRATION AMPLITUDE-
                         TO-FEED RATIO: Q DESIGNATED ARGUMENT)
N03 G99 G1 X10.0 F0.05;  (CUTTING FEED COMMAND 0.05 mm/r)
N04 X20.0 F0.10;         (CUTTING FEED COMMAND 0.10 mm/r)
N05 G165 P0;             (END OF VIBRATION-CUTTING CONTROL MODE)
:
```
~432

```
N01 G0 X0.0;
N02 G165 P1 W2.0;          (START OF VIBRATION-CUTTING CONTROL MODE AND PHASE DIFFERENCE BETWEEN VIBRATIONAL
                            FORWARD-MOVING AND VIBRATIONAL BACKWARD-MOVING POSITIONS: W DESIGNATED ARGUMENT)
N03 G99 G1 X10.0 F0.05;    (CUTTING FEED COMMAND 0.05 mm/r)
N04 X20.0 F0.10;           (CUTTING FEED COMMAND 0.10 mm/r)
N05 G165 P0;               (END OF VIBRATION-CUTTING CONTROL MODE)
```

NUMERICAL CONTROL DEVICE

CROSS REFERENCE TO RELATED APPLICATIONS

This application is a National Stage of International Application No. PCT/JP2014/061488 filed Apr. 23, 2014, the contents of all of which is incorporated herein by reference in its entirety.

FIELD

The present invention relates to a numerical control device.

BACKGROUND

A numerical control device has been proposed for turning. The numerical control device includes a cutting-tool feed mechanism that feeds a cutting tool with respect to a workpiece and a control mechanism that controls the cutting-tool feed drive motor such that the cutting tool vibrates at a low frequency (see, for example, Patent Literatures 1 to 3). In this numerical control device, the control mechanism includes an operation unit that performs various settings, a vibration-cutting-information storage unit that has stored therein in advance at least the amount of forward movement, the amount of backward movement, the speed of forward movement, and the speed of backward movement of the cutting-tool feed mechanism according to mechanical characteristics such as the inertia of the feed axis or motor characteristics, as a table of data to synchronize and feed the cutting tool so as to be operable at a low frequency of 25 hertz or higher according to the rotational speed of the workpiece or the amount of feed of the cutting tool per revolution of the cutting tool, which is set by the operation unit, and a motor control unit that controls the cutting-tool feed drive motor on the basis of the data stored in the vibration-cutting-information storage unit. With this configuration, forward movement and backward movement are repeated along an interpolation path, thereby generating low-frequency vibrations.

CITATION LIST

Patent Literatures

Patent Literature 1: Japanese Patent No. 5033929
Patent Literature 2: Japanese Patent No. 5139591
Patent Literature 3: Japanese Patent No. 5139592

SUMMARY

Technical Problem

In Patent Literatures 1 to 3 mentioned above, a vibration control is divided into forward-movement vibration control and backward-movement vibration control, and the distance and speed of the forward movement and the distance and speed of the backward movement are defined as individual vibration conditions in a vibration-condition table so as to relate the cutting feed speed to the amplitude in low-frequency vibration cutting. This results in a problem that low-frequency vibrations cannot be applied at a speed other than the cutting feed speed that meets the vibration conditions defined in this vibration-condition table.

The present invention has been achieved in view of the above, and an object of the present invention is to provide a numerical control device that performs cutting while applying low-frequency vibrations and can select any cutting feed speed.

Solution to Problem

In order to achieve the object, the numerical control device according to the present invention relates to a numerical control device that performs machining on a workplace while moving a tool and the workpiece relative to each other along a movement path with vibrations by drive shafts with which the tool or the workpiece is provided, the device including: a phase-difference calculation unit that calculates, as a phase difference, a time lag in a vibrational backward-moving position relative to a vibrational forward-moving position generated on a basis of a command block in a machining program from a ratio between an amplitude of the vibrations and a feed speed of the tool to the workpiece, the ratio being designated for the movement; a movement-path generation unit that generates the vibrational forward-moving position and the vibrational backward-moving position as the movement path for each of the drive shafts on a basis of the phase difference; a vibrational-movement-amount generation unit that calculates a vibrational-movement amount on the movement path for each of the drive shafts on a basis of a reference vibration waveform to be superimposed on the movement path; and a movement-amount combining unit that generates a combined movement amount for each of the drive shafts by adding the vibrational-movement amount to the movement path.

Advantageous Effects of Invention

According to the present invention, the numerical control device generates a movement path using a machining program and a phase difference that is a time lag in a vibrational backward-moving position relative to a vibrational forward-moving position. Therefore, an effect is obtained where, in low-frequency vibration cutting, a user can select any cutting feed speed. The phase difference can be calculated from the ratio between the vibration amplitude and the feed speed of the tool to the workpiece, and moreover, the phase difference can be designated by a parameter or the machining program for relative movement of the tool and the workpiece with vibrations.

BRIEF DESCRIPTION OF DRAWINGS

FIG. 6 is a diagram showing an example of a machining program and an example of a parameter in a case where a vibration amplitude-to-feed ratio is stored as a parameter in a storage unit.

FIG. 7 is a diagram showing an example of a machining program with a designated vibration amplitude-to-feed ratio.

FIG. 11 is a diagram showing an example of a machining program with a designated phase difference.

DESCRIPTION OF EMBODIMENTS

A numerical control device according to embodiments of the present invention will be explained below in detail with reference to the accompanying drawings. The present invention is not limited to the embodiments.

First Embodiment

Figure 1:
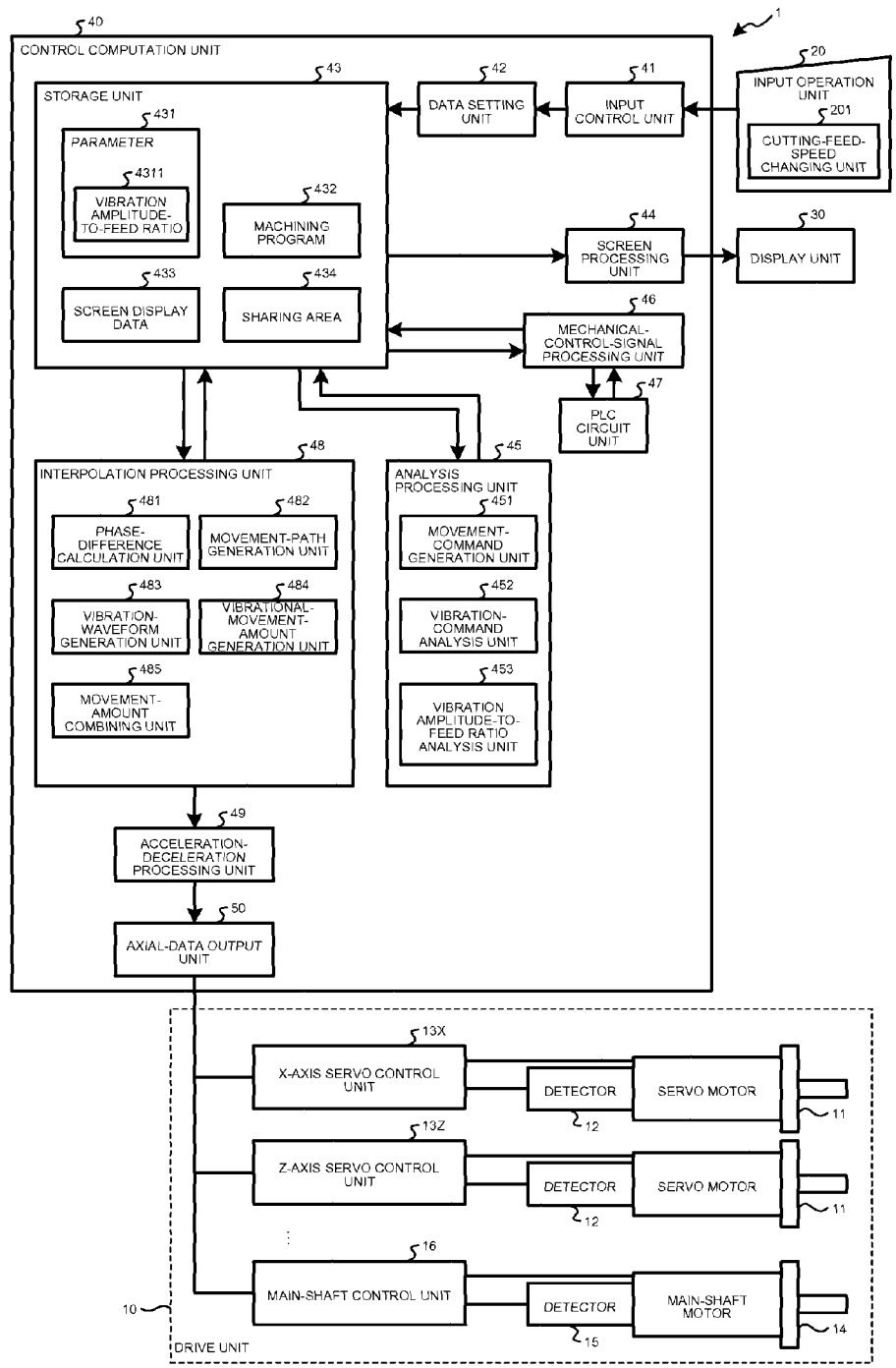
FIG. 1 is a block diagram showing an example of a configuration of a numerical control device according to a first embodiment.

FIG. 1 is a block diagram showing an example of a configuration of a numerical control device according to a first embodiment. A numerical control device 1 includes a drive unit 10, an input operation unit 20, a display unit 30, and a control computation unit 40.

The drive unit 10 is a mechanism that drives one or both of the workpiece and the tool in at least two axial directions. The drive unit 10 includes a servo motor 11 that moves the workpiece or the tool in each of the axial directions specified in the numerical control device 1, a detector 12 that detects the position and speed of the servo motor 11, and a servo control unit 13 for each of the axial directions (an X-axis servo control unit 13X, a Z-axis servo control unit 13Z, . . . (hereinafter, simply expressed as "servo control unit 13" when it is not necessary to distinguish the drive-shaft directions from each other)), where the servo control unit 13 controls the position and speed of the workpiece or the tool on the basis of the position and speed detected by the detector 12. The drive unit 10 further includes a main-shaft motor 14 that rotates the main shaft that holds the workpiece, a detector 15 that detects the position and rotational speed of the main-shaft motor 14, and a main-shaft control unit 16 that controls rotations of the main shaft on the basis of the position and rotational speed detected by the detector 15.

The input operation unit 20 is configured from an input unit such as a keyboard, a button, or a mouse, through which a user inputs a command and the like for the numerical control device 1 or inputs a machining program, a parameter, or the like. The input operation unit 20 includes a cutting-feed-speed changing unit 201 that can change the cutting feed speed. The cutting-feed-speed changing unit 201 is configured from, for example, a dial. The present cutting feed speed can be changed by turning the dial. A change in the cutting feed speed by the cutting-feed-speed changing unit 201 is, for example, input to a parameter 431 included in the control computation unit 40. The display unit 30 is configured from a liquid crystal display device or other display units and displays thereon information processed by the control computation unit 40.

The control computation unit 40 includes an input control unit 41, a data setting unit 42, a storage unit 43, a screen processing unit 44, an analysis processing unit 45, a mechanical-control-signal processing unit 46, a PLC (Programmable Logic Controller) circuit unit 47, an interpolation processing unit 48, an acceleration-deceleration processing unit 49, and an axial-data output unit 50.

The input control unit 41 receives information that is input from the input operation unit 20. The data setting unit 42 stores the information received by the input control unit 41 in the storage unit 43. For example, when the content of the input relates to editing of a machining program 432, the machining program 432 stored in the storage unit 43 is affected by the edited content, or when a parameter is input, this input parameter is stored in a storage area of the parameter 431 in the storage unit 43.

The storage unit 43 stores therein information such as the parameter 431 to be used for processing in the control computation unit 40, the machining program 432 to be executed, and screen display data 433 to be displayed on the display unit 30. The storage unit 43 is provided with a sharing area 434 that stores therein temporarily-used data other than the parameter 431 and the machining program 432. The parameter 431 can include a vibration amplitude-to-feed ratio 4311 that specifies the ratio between the vibration amplitude and the feed speed for creating a movement path. The vibration amplitude-to-feed ratio 4311 is stored when it is designated by the parameter 431, not by the machining program 432. In the parameter 431, vibration conditions can be stored. The screen processing unit 44 executes a control of displaying the screen display data 433 in the storage unit 43 on the display unit 30.

The analysis processing unit 45 includes a movement-command generation unit 451, a vibration-command analysis unit 452, and a vibration amplitude-to-feed ratio analysis unit 453. The movement-command generation unit 451 reads a machining program including one or more blocks, analyzes the read machining program block by block, and generates a movement command for movement in each block. The vibration-command analysis unit 452 analyzes whether a vibration command is included in the machining program and generates, when the vibration command is included in the machining program, vibration information, such as the frequency and amplitude included in the vibration command. In the specification of the present invention, it is desirable that the amplitude of a vibration command included in a machining program is equal to greater than 1 micron and equal to or less than 300 microns. This is because if the amplitude is less than 1 micron, the cutting efficiency is degraded and the servo system cannot respond to vibrations, and if the amplitude is greater than 300 microns, it may lead to mechanical vibrations. It is also desirable that the frequency is equal to or higher than 10 hertz and equal to or lower than 300 hertz. This is because if the frequency is lower than 10 hertz, there is no vibration-cutting effect, and if the frequency is higher than 300 hertz, the servo system cannot respond to vibrations. The vibration amplitude-to-feed ratio analysis unit 453 analyzes whether a vibration amplitude-to-feed ratio is included in a machining program and obtains the vibration amplitude-to-feed ratio when it is included in the machining program.

When the analysis processing unit 45 reads an auxiliary command as a command for operating a machine other than a command for operating a numerically-controlled shaft (the drive shaft), the mechanical-control-signal processing unit 46 notifies the PLC circuit unit 47 that the auxiliary command has been issued. Upon receiving the notification that the auxiliary command has been issued from the mechanical-control-signal processing unit 46, the PLC circuit unit 47 performs processing corresponding to this auxiliary command.

The interpolation processing unit 48 includes a phase-difference calculation unit 481, a movement-path generation unit 482, a vibration-waveform generation unit 483, a vibrational-movement-amount generation unit 484, and a movement-amount combining unit 485.

The phase-difference calculation unit 481 calculates a phase difference from the vibration amplitude-to-feed ratio obtained from the analysis processing unit 45 or the storage unit 43. The phase difference shows a time lag in the vibrational backward-moving position relative to the vibrational forward-moving position created on the basis of a command.

The movement-path generation unit 482 uses the phase difference calculated by the phase-difference calculation unit 481 to generate a movement path relative to time in each axial direction per unit time (an interpolation cycle). In this example, a movement path relative to time based on a targeted command block is acquired as the vibrational forward-moving position, and a movement path, obtained by displacing the vibrational forward-moving position in parallel in a direction that delays the time by the phase difference, is acquired as the vibrational backward-moving position.

On the basis of the vibration command obtained from the analysis processing unit 45 or the storage unit 43, the vibration-waveform generation unit 483 generates, for each axis, a vibration waveform that is a reference for vibrating the tool or the workpiece (hereinafter, "reference vibration waveform"). The reference vibration waveform shows the position relative to time in each axial direction. While any vibration waveform can be used as the reference vibration waveform, the vibration waveform is a triangular wave in this example. This triangular wave has an amplitude of 1.0 and a cycle value designated in the vibration conditions.

The vibrational-movement-amount generation unit 484 acquires a difference between the vibrational forward-moving position and the vibrational backward-moving position at each time and multiplies this difference by the vibration waveform to calculate a vibrational-movement amount for each axis.

The movement-amount combining unit 485 adds the vibrational backward-moving position, generated by the movement-path generation unit 482, to the vibrational-movement amount, generated by the vibrational-movement-amount generation unit 484, in order to calculate a combined movement amount for each axis per unit time (an interpolation cycle).

The acceleration-deceleration processing unit 49 converts the combined movement amount for each drive shaft, output from the interpolation processing unit 48, into a movement command per unit time that takes into account acceleration and deceleration according to an acceleration-deceleration pattern designated in advance. The axial-data output unit 50 outputs the movement command per unit time processed by the acceleration-deceleration processing unit 49 to the servo control units 13X, 13Z, which control the drive shafts, respectively, and to the main-shaft control unit 16.

Figure 2:
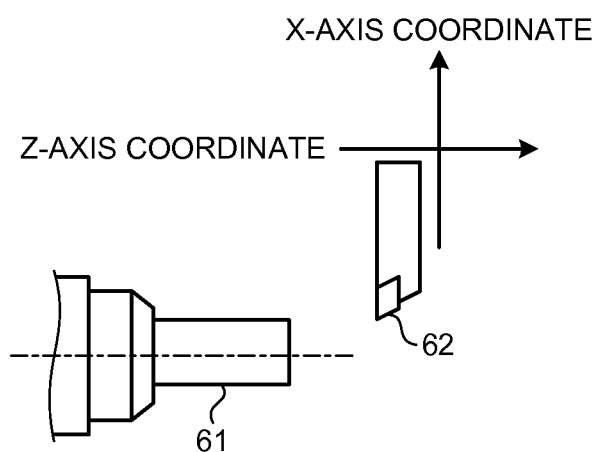
FIG. 2 is a diagram schematically showing configurations of axes of the numerical control device according to the first embodiment, which performs turning.
Figure 2:
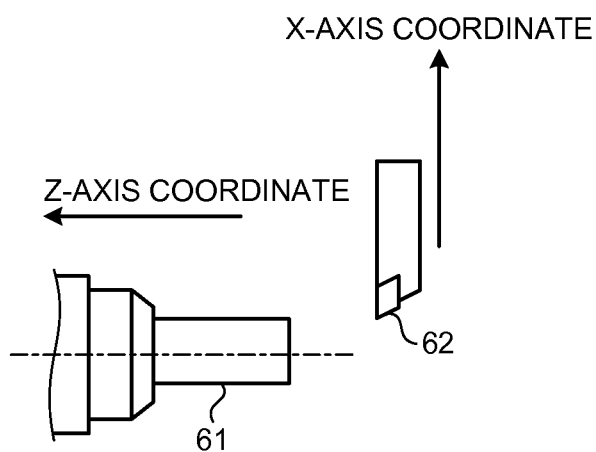

In order to perform machining while vibrating the tool or the workpiece, it suffices that the tool and the workpiece are moved relative to each other when machining is performed, as described above. FIG. 2 is a diagram schematically showing configurations of axes of the numerical control device according to the first embodiment, which performs turning. In FIG. 2, the Z axis and the X axis that are perpendicular to each other are provided on the drawing sheet. FIG. 2(a) shows a case where a workpiece 61 is fixed and a tool 62 that is, for example, a turning tool for performing turning, is only moved in the Z-axis and X-axis directions. FIG. 2(b) shows a case where the workpiece 61 is moved in the Z-axis direction and the tool 62 is moved in the X-axis direction. In either of these cases, by providing an object to be moved (the workpiece 61 and/or the tool 62) with the serve motor 11, it is possible to perform processing explained below.

Figure 3:
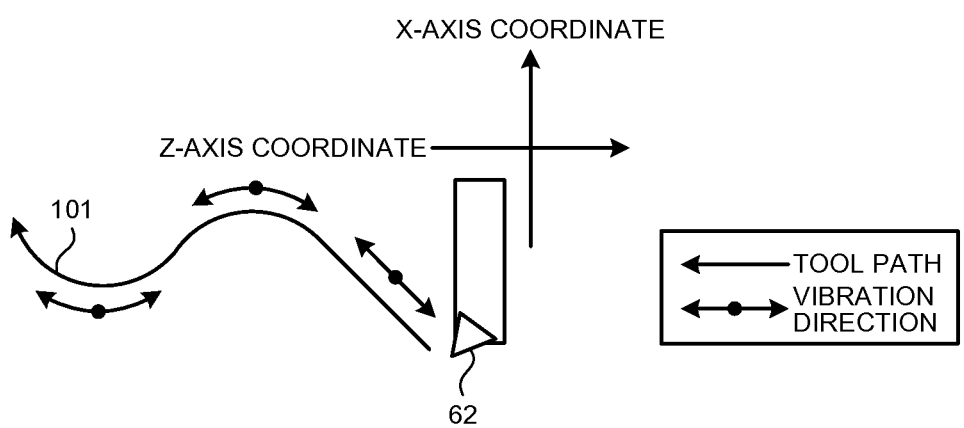
FIG. 3 is a diagram schematically showing a method of machining while applying low-frequency vibrations.

FIG. 3 is a diagram schematically showing a method of machining while applying low-frequency vibrations. FIG. 3 shows a case where the Z axis and the X axis that are perpendicular to each other are provided on the drawing sheet and machining is performed while moving the tool 62 and a workpiece relative to each other along a movement path 101 on this Z-X plane. In the first embodiment, when the tool 62 is moved relative to the workpiece along the movement path 101, the tool 62 is vibrated so as to follow the movement path 101. That is, in a straight-line section, the tool 62 is vibrated so as to move back and forth along the straight line, and in a curved-line section, the tool 62 is vibrated so as to move back and forth along the curved line. The description "the tool 62 is vibrated" refers to the motion of the tool 62 relative to the workpiece 61. In practice, either the tool 62 or the workpiece 61 can be moved as shown in FIG. 2. The same applies to the following explanations.

Figure 4:
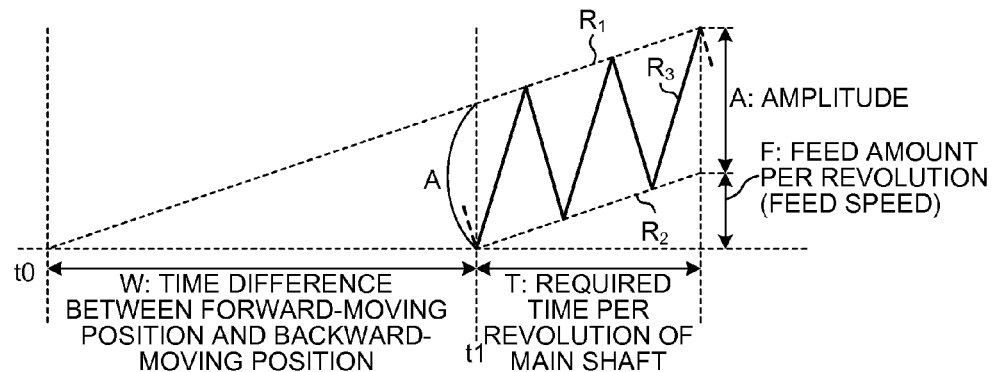
FIG. 4 is a diagram schematically showing an example of a procedure of movement-amount calculation processing in an interpolation processing unit according to the first embodiment (part 1).
Figure 4:
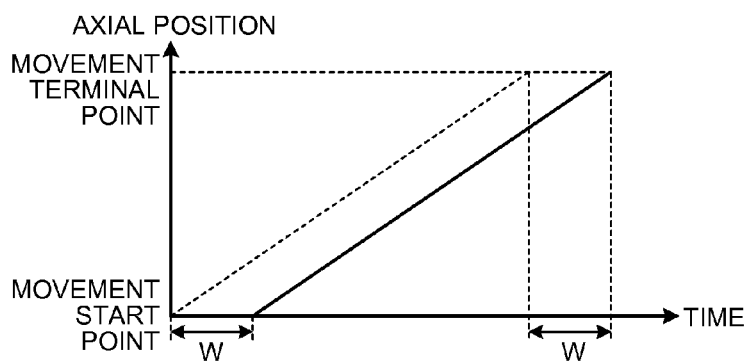
Figure 4:
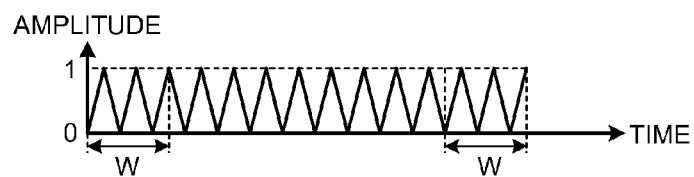
Figure 4:
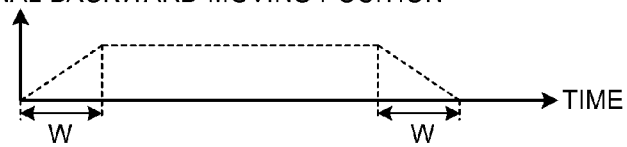
Figure 4:
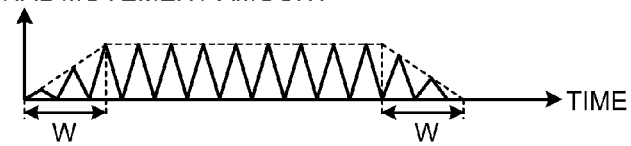
Figure 5:
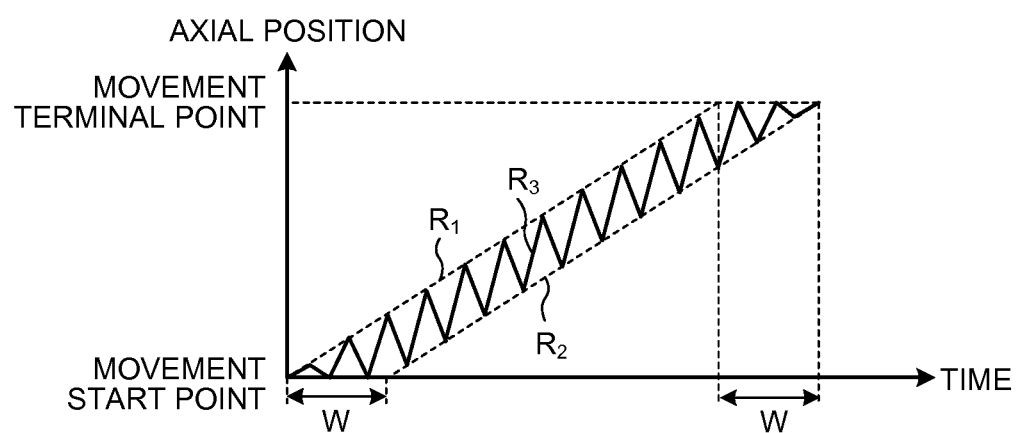
FIG. 5 is a diagram schematically showing an example of a procedure of movement-amount calculation processing in the interpolation processing unit according to the first embodiment (part 2).

Next, a movement-path calculation method performed by the numerical control device 1 according to the first embodiment is explained. FIGS. 4 and 5 are diagrams each schematically showing an example of a procedure of movement-amount calculation processing in an interpolation processing unit according to the first embodiment.

First, the movement-command generation unit 451 in the analysis processing unit 45 generates a movement command, including the start point and the terminal point, from a command block in a machining program and outputs the movement command to the interpolation processing unit 48. The vibration-command analysis unit 452 outputs vibration conditions, including the frequency and amplitude included in the machining program or set by a parameter, to the interpolation processing unit 48. The vibration amplitude-to-feed ratio analysis unit 453 outputs a vibration amplitude-to-feed ratio included in the machining program or a vibration amplitude-to-feed ratio set by a parameter to the interpolation processing unit 48.

Thereafter, the phase-difference calculation unit 481 acquires a phase difference W from the vibration amplitude-to-feed ratio obtained from the analysis processing unit 45 or the storage unit 43. A vibration amplitude-to-feed ratio Q is expressed by the following equation (1), where the amplitude on a movement path relative to time is represented as A and the feed amount per revolution (the feed speed) is represented as F.

$$Q=A/F \qquad (1)$$

A required time per revolution of the main shaft is represented as T and the feed amount during T is represented as F. Therefore, a movement path in the case of advancing by the feed amount F per revolution while vibrating with the amplitude A from a certain time point t1 is shown by $R_3$ in FIG. 4(a). The straight line connecting peak positions on this movement path $R_3$ is a vibrational forward-moving position $R_1$. The straight line connecting valley positions on this movement path $R_3$ is a vibrational backward-moving position $R_2$. In this example, the vibrational forward-moving position $R_1$ corresponds to a movement path generated by a command. When the time at which the vibrational forward-moving position $R_1$ is 0 is represented as t0, the phase difference W is expressed by the following equation (2).

$$W = t1 - t0 \quad (2)$$

As understood from the diagram shown in FIG. 4(a), there is a relationship expressed as the following equation (3) between the phase difference W, the amplitude A, the feed amount F per revolution, and the required time T per revolution of the main shaft. On the basis of the equation (3), the phase difference W is expressed by the following equation (4).

$$A/W = F/T \quad (3)$$

$$W = AT/F = QT \quad (4)$$

The phase-difference calculation unit 481 calculates the phase difference W using the vibration amplitude-to-feed ratio and the equation (4) as described above.

Subsequently, the movement-path generation unit 482 generates a movement path relative to time in each axial direction from a targeted command. At this time, in the case where the type of machining is cutting vibration, the movement-path generation unit 482 uses a phase difference calculated by the phase-difference calculation unit 481 to create two types of path, i.e., one for the vibrational forward-moving position $R_1$ and one for the vibrational backward-moving position $R_2$.

Specifically, the vibrational forward-moving position $R_1$ is a path generated on the basis of the movement command obtained from the movement-command generation unit 451 and is generated so as to remain at the same position upon reaching the movement terminal point up until the vibrational backward-moving position $R_2$ reaches the movement terminal point. After the vibrational forward-moving position $R_1$ starts moving, the vibrational backward-moving position $R_2$ waits for the phase difference W and then starts moving. The vibrational forward-moving position $R_1$ and the vibrational backward-moving position $R_2$ in an axial direction, which are created according to the rules as described above, are shown in FIG. 4(b).

Thereafter, the vibration-waveform generation unit 483 uses the vibration conditions obtained from the vibration-command analysis unit 452 to generate a reference vibration waveform to be superimposed on a movement path. Specifically, the vibration-waveform generation unit 483 generates a vibration waveform with the frequency in the vibration conditions and with the amplitude (a peak-to-valley height) of 1. In this case, a preset waveform (for example, a triangular wave) is used as the vibration waveform. The reference vibration waveforms in the X-axis direction and the Z-axis direction, generated according to the rules as described above, are shown in FIG. 4(c). The reference vibration waveforms are functions of time.

Subsequently, the vibrational-movement-amount generation unit 484 acquires a difference between the vibrational forward-moving position and the vibrational backward-moving position at each time. The difference between the vibrational forward-moving position and the vibrational backward-moving position in an axial direction is shown in FIG. 4(d). Further, the vibrational-movement-amount generation unit 484 multiplies the difference between the vibrational forward-moving position and the vibrational backward-moving position by the reference vibration waveform generated by the vibration-waveform generation unit 483 to calculate a vibrational-movement amount. That is, in each axial direction, the vibrational-movement amount is calculated by multiplying the graph in FIG. 4(c) by the graph in FIG. 4(d). The vibrational-movement amount in an axial direction, calculated as described above, is shown in FIG. 4(e).

The movement-amount combining unit 485 then generates a movement path relative to time for each axis by superimposing (adding) the vibrational backward-moving position, generated by the movement-path generation unit 482, and the vibrational-movement amount, generated by the vibrational-movement-amount generation unit 484, on (to) each other. The movement path $R_3$ in an axial direction, generated as described above, is shown in FIG. 5.

As shown in FIG. 5, even when the movement path $R_3$ corresponding to a targeted command reaches the target position, the movement path $R_3$ does not exceed the target position until the vibrational backward-moving position on the movement path $R_3$ reaches the target position. Thereafter, while the amplitude is gradually reduced, the vibrational backward-moving position on the movement paths $R_3$ reaches the target position. When the vibrational backward-moving position on the movement path $R_3$ reaches the target position and vibrations converge, the next command with vibrations is executed so as to have a set vibration amplitude-to-feed ratio. With the procedure as described above, the movement-amount calculation processing is finished.

In the explanations described above, a waveform is calculated per block of a machining program for ease of explanation of the content of the embodiment. However, in practice, the interpolation processing unit 48 performs the calculation per unit time (an interpolation cycle).

As described above, the vibration amplitude-to-feed ratio can be stored in the storage unit 43 as the parameter 431 or can be set in a machining program. FIG. 6 is a diagram showing an example of a machining program and an example of a parameter in a case where the vibration amplitude-to-feed ratio is stored as a parameter in a storage unit. The machining program 432 is read row by row (block by block) shown in FIG. 6(a) to be executed. A command "G0 X0.0;" represented by the sequence number "N01" in this machining program 432 is a positioning command. A command "G165 P1;" represented by the sequence number "N02" means the start of a vibration-cutting control mode.

A command "G99 G1 X10.0 F0.05;" represented by the sequence number "N03" indicates execution of cutting feed to move from X=0.0 to X=10.0 by linear interpolation. "F" and its subsequent numerical value mean the cutting feed amount per revolution of the main shaft (millimeters, for example). In this example, a cutting feed command is 0.05 mm/r. As the cutting feed speed, the cutting feed amount per minute can also be used.

A command "X20.0 F0.10;" represented by the sequence number "N04" indicates execution of cutting feed to move from X=10.0 to X=20.0 by linear interpolation. In this example, a cutting feed command is 0.10 mm/r. A command "G165 P0;" represented by the sequence number "N05" means the end of the vibration-cutting control mode. As shown in FIG. 6(b), the vibration amplitude-to-feed ratio of "2.0" is stored in the parameter 431 as a parameter set value.

FIG. 7 is a diagram showing an example of a machining program with a designated vibration amplitude-to-feed ratio. The content of FIG. 7 is basically the same as that of FIG. 6(a). However, the content of FIG. 7 is different from that of FIG. 6(a) in that the vibration amplitude-to-feed ratio is set as "Q" in a command for starting the vibration-cutting control mode represented by the sequence number "N02".

Figure 8:
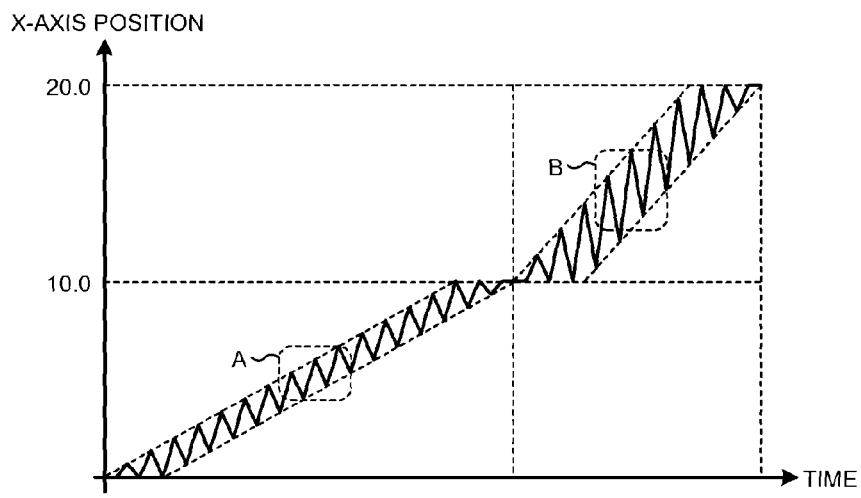
FIG. 8 is a diagram showing a movement path relative to time in the X-axis direction.
Figure 8:
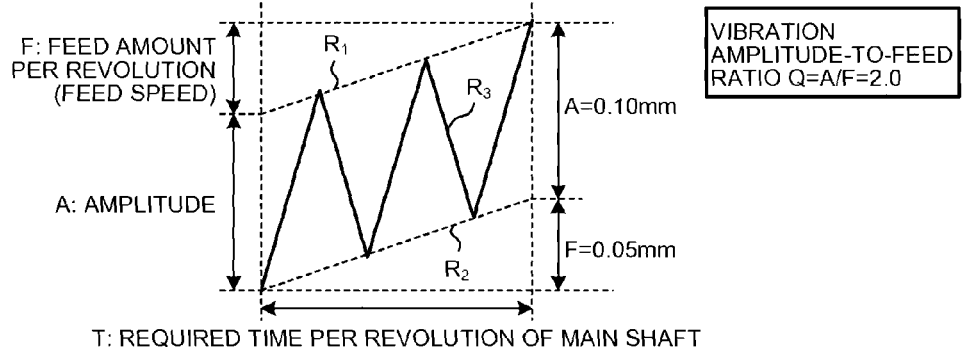
Figure 8:
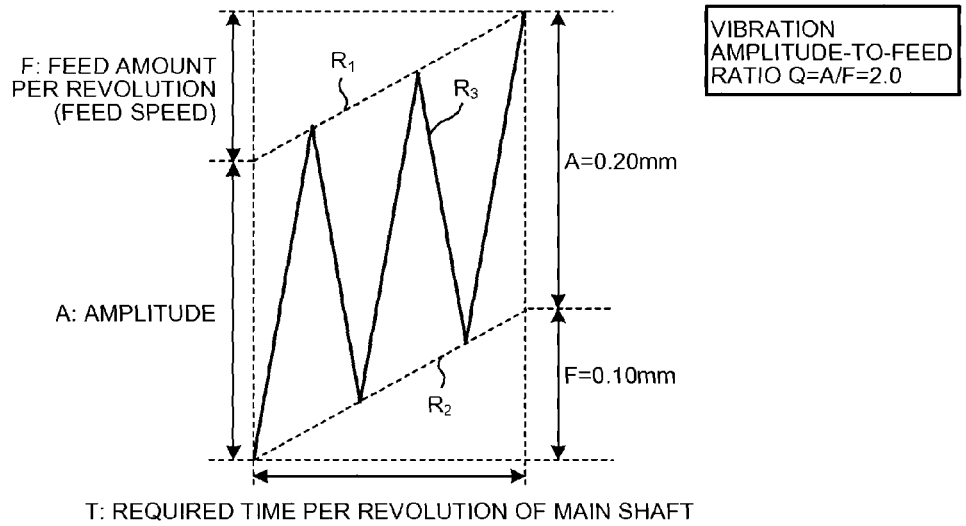

FIG. 8 is a diagram showing a movement path relative to time in the X-axis direction. FIG. 8(a) is a diagram showing a movement path relative to time in the X-axis direction, generated according to FIG. 6 or FIG. 7. FIG. 8(b) is an enlarged diagram of a portion A in FIG. 8(a). FIG. 8(c) is an enlarged diagram of a portion B in FIG. 8(a).

As shown in FIG. 8(a), the vibration amplitude-to-feed ratio is 2.0 in both machining from X=0.0 to X=10.0 and machining from X=10.0 to X=20.0. The cutting feed speed from X=10.0 to X=20.0 is twice as high as the cutting feed speed from X=0.0 to X=10.0.

In FIG. 8(b), the horizontal axis represents the required time T per revolution of the main shaft and the vertical axis represents the X-axis position. The gradient of the vibrational forward-moving position $R_1$ and the vibrational backward-moving position $R_2$ is equal to the feed amount F per revolution, that is 0.05 millimeters. The equation (1) is modified to obtain the amplitude A that is 0.10 millimeters.

Meanwhile, in FIG. 8(c), the horizontal axis represents the required time T per revolution of the main shaft and the vertical axis represents the X-axis position. The gradient of the vibrational forward-moving position $R_1$ and the vibrational backward-moving position $R_2$ is equal to the feed amount F per revolution, that is 0.10 millimeters. The equation (1) is modified to obtain the amplitude A that is 0.20 millimeters. That is, in machining processing from X=10.0 to X=20.0, as compared to the case of machining processing from X=0.0 to X=10.0, the cutting feed speed is doubled, and accordingly the amplitude is also doubled.

When the cutting-feed-speed changing unit 201 in the input operation unit 20 is operated so as to change the cutting feed speed, the cutting feed speed is dynamically changed while the vibration amplitude-to-feed ratio remains to be a set value, as explained above. For example, in FIG. 8, while the vibration amplitude-to-feed ratio remains unchanged, the gradient of a movement path is changed. Also in the case where the cutting feed speed is changed by the cutting-feed-speed changing unit 201 as described above, processing identical to the above processing is performed.

In the first embodiment, the vibration amplitude-to-feed ratio is set in a parameter or the vibration amplitude-to-feed ratio is set in a machining program, and on the basis of the set vibration amplitude-to-feed ratio, a movement path with vibrations in each axial direction is generated. With this configuration, in low-frequency vibration cutting, an effect is obtained where a user can select any cutting feed speed.

By providing the cutting-feed-speed changing unit 201, the cutting feed speed can be changed during low-frequency vibration cutting and thus a movement path is changed in a state where the vibration amplitude-to-feed ratio is maintained, i.e., so as to have an amplitude obtained by multiplying the changed cutting feed speed by the vibration amplitude-to-feed ratio. With this configuration, an effect is obtained where the cutting feed speed can be changed freely (in real-time or continuously) even during low-frequency vibration cutting.

Further, the vibration amplitude-to-feed ratio is set such that, when a first axial position on a movement path at the time when the maim shaft is at a certain rotation phase and a second axial position on a movement path at the time when the main shaft is at the above rotation phase after rotating by one or more revolutions are compared with each other, the rotation phase at which the first axial position is located closer to the movement start point than the second axial position in an advancing direction and a rotation phase at which the second axial position is located closer to the movement start point than the first axial position in an advancing direction are present. Therefore, swarf resulting from cutting with a cutting tool can be broken into smaller pieces. As a result, an effect is obtained where the life span of the cutting tool is extended and also the swarf can be easily handled.

Second Embodiment

In the first embodiment, the vibration amplitude-to-feed ratio is made constant when cutting machining with low-frequency vibrations is performed. In a second embodiment, a case is explained in which, instead of the vibration amplitude-to-feed ratio, a phase difference is made constant in order to perform the machining.

In FIG. 4(a) and the equation (4), when the required time T per revolution of the main shaft is defined as 1, the phase difference W is equal to the vibration amplitude-to-feed ratio Q. That is, even when the phase difference W is designated instead of the vibration amplitude-to-feed ratio Q, it is still possible to perform processing identical to that in the first embodiment.

Figure 9:
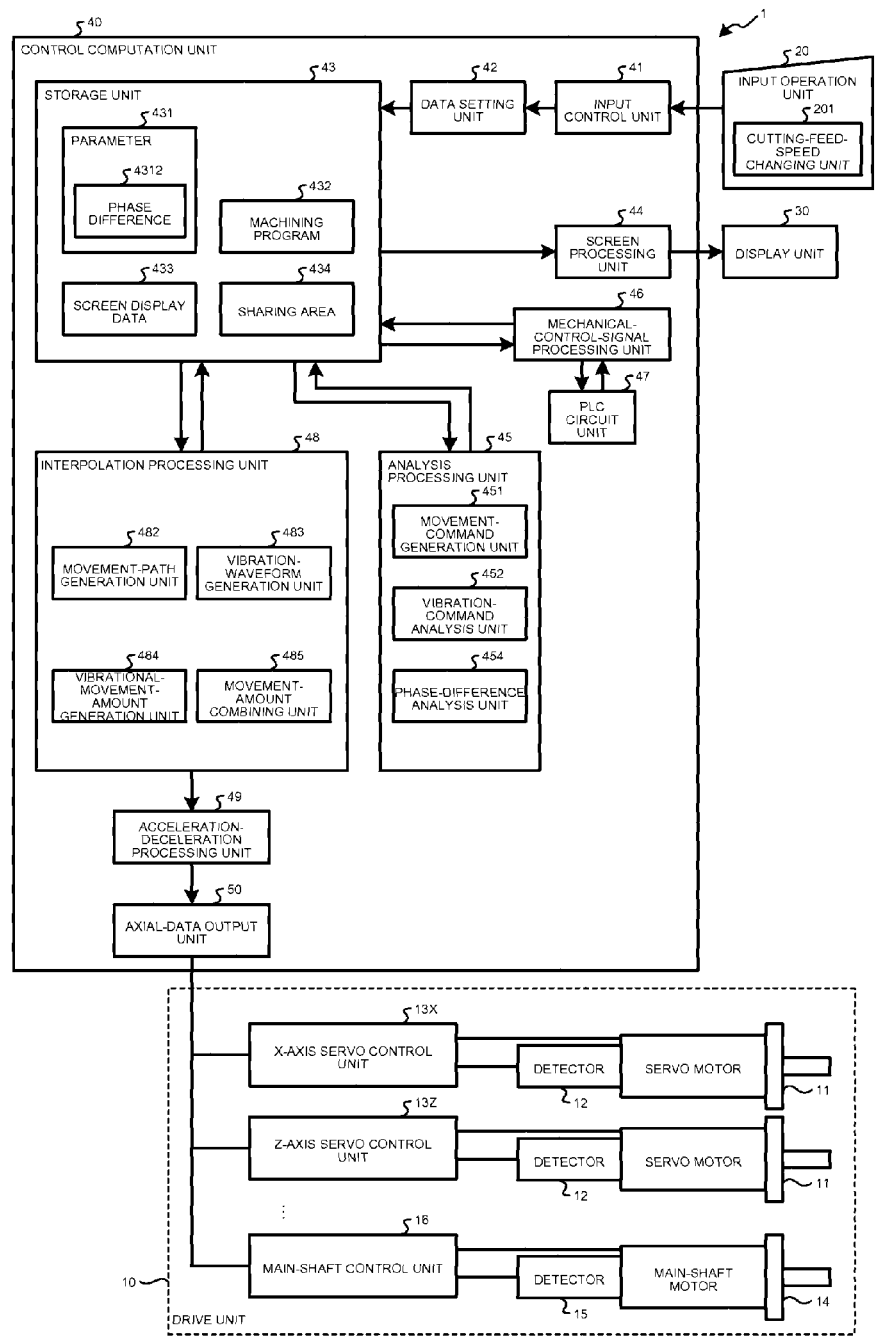
FIG. 9 is a block diagram showing an example of a configuration of a numerical control device according to a second embodiment.

FIG. 9 is a block diagram showing an example of a configuration of a numerical control device according to the second embodiment. In this numerical control device 1, the storage unit 43, the analysis processing unit 45, and the interpolation processing unit 48 are configured differently from those in the first embodiment.

The parameter 431 in the storage unit 43 can include a phase difference 4312 instead of the vibration amplitude-to-feed ratio 4311. The phase difference 4312 is stored when it is designated by the parameter 431, not by the machining program 432. As described above, the phase difference 4312 is (a period of time) obtained by subtracting the amplitude in the vibration conditions from a path created on the basis of a movement command at a certain position passed according to the movement command.

The analysis processing unit 45 includes a phase-difference analysis unit 454 instead of the vibration amplitude-to-feed ratio analysis unit 453. The phase-difference analysis unit 454 analyzes whether a phase difference is included in the machining program 432 and obtains the phase difference when it is included in the machining program 432.

The interpolation processing unit 48 is configured such that the phase-difference calculation unit 481 is not included. The movement-path generation unit 482 does not use a phase difference calculated by the phase-difference calculation unit 481, but uses a phase difference obtained from the analysis processing unit 45 or the storage unit 43 to generate a movement path relative to time in each axial direction per unit time (an interpolation cycle). Constituent elements identical to those in the first embodiment are denoted by like reference signs and redundant explanations thereof will be omitted.

A machining method performed by the numerical control device 1 according to the second embodiment is the same as that in FIG. 4, except that processing for calculating a phase difference in FIG. 4(a) is not performed. Therefore, explanations of the machining method will be also omitted.

Figure 10:
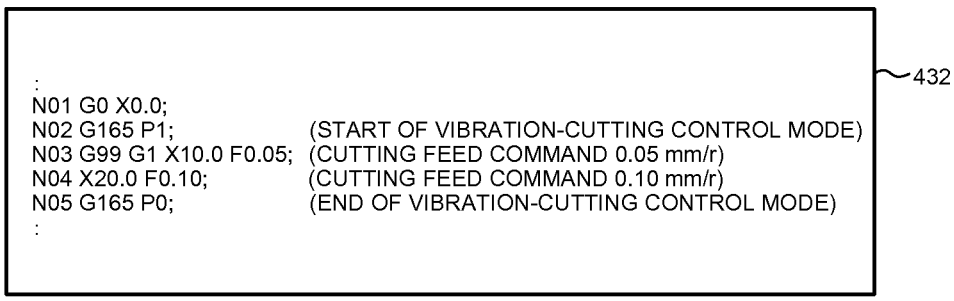
FIG. 10 is a diagram showing an example of a machining program and an example of a parameter in a case where a phase difference is stored as a parameter in a storage unit.
Figure 10:
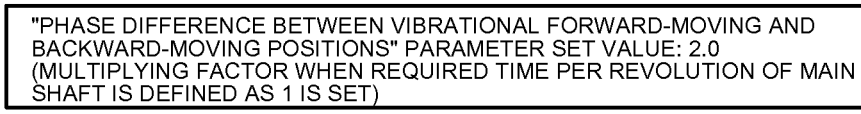

As described above, the phase difference can be stored in the storage unit 43 as the parameter 431 or can be set in the machining program 432. FIG. 10 is a diagram showing an example of a machining program and an example of a parameter in a case where the phase difference is stored as a parameter in a storage unit. The machining program 432 shown in FIG. 10(a) is the same as that shown in FIG. 6(a) in the first embodiment. As shown in FIG. 10(b), the phase difference of "2.0" is stored in the parameter 431 as a parameter set value. The phase difference is a difference between a vibrational forward-moving position and a vibrational backward-moving position. The multiplying factor when the required time per revolution of the main shaft is defined as 1 is set.

FIG. 11 is a diagram showing an example of a machining program with a designated phase difference. The content of FIG. 11 is basically the same as that shown in FIG. 7 in the first embodiment. However, the content of FIG. 11 is different from that of FIG. 7 in that the phase difference is set as "W" in a command for starting the vibration-cutting control mode represented by the sequence number "N02". As the phase difference designated as "W", the multiplying factor when the required time per revolution of the main shaft is defined as 1 is set.

Figure 12:
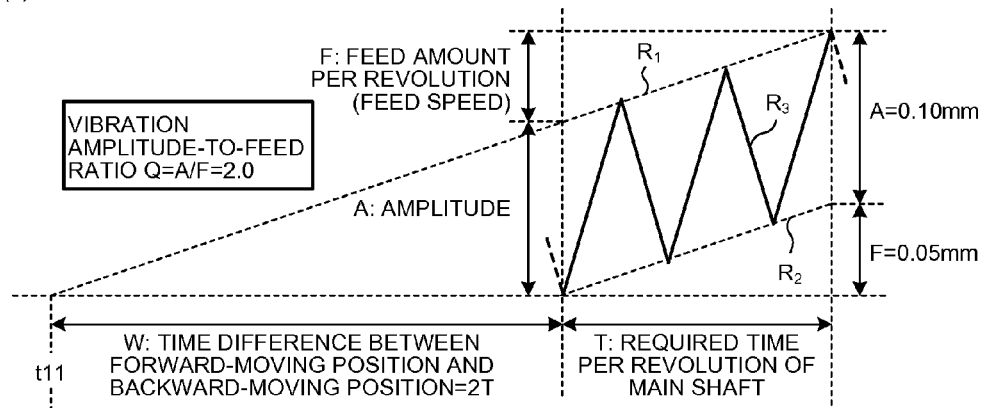
FIG. 12 is a diagram showing a movement path relative to time in the X-axis direction.
Figure 12:
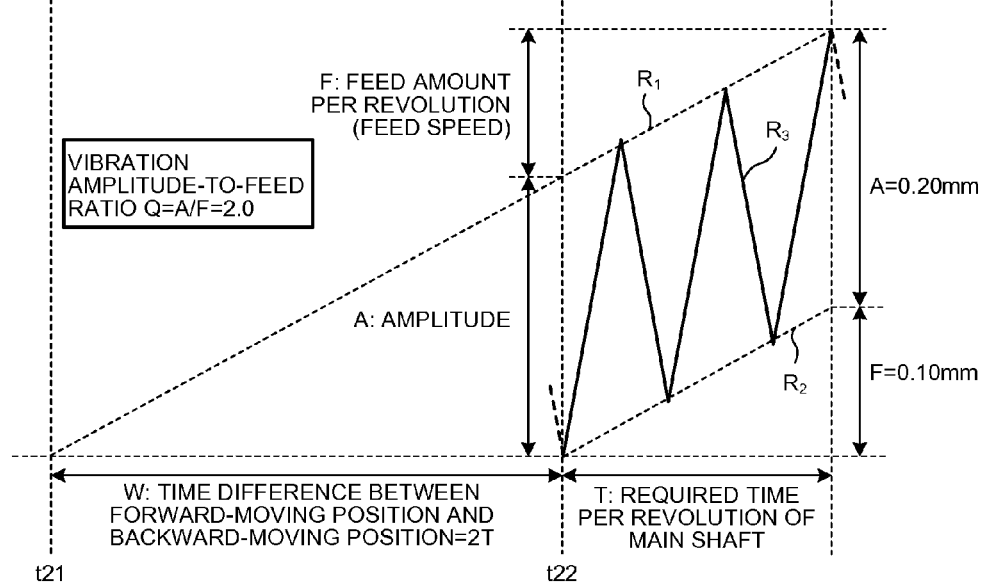

FIG. 12 is a diagram showing a movement path relative to time in the X-axis direction. FIG. 12(a) is an enlarged diagram of the portion A in FIG. 8. FIG. 12(b) is an enlarged diagram of the portion B in FIG. 8. In FIGS. 12(a) and 12(b), the horizontal axis represents the required time T per revolution of the main shaft and the vertical axis represents the X-axis position.

In FIG. 12(a), the gradient of the vibrational forward-moving position $R_1$ and the vibrational backward-moving position $R_2$ is equal to the feed amount F per revolution, that is 0.05 millimeters. The equation (1) is modified to obtain the amplitude A that is 0.10 millimeters. Therefore, the vibration amplitude-to-feed ratio is 2.0. Further, as understood from FIG. 12(a), the phase difference W is a difference t12–t11 between a time t12 at which the vibrational backward-moving position $R_2$ is 0 and a time t11 at which the vibrational forward-moving position $R_1$ is 0. This phase difference W is derived as 2T from the equation (4).

Meanwhile, in FIG. 12(b), the gradient of the vibrational forward-moving position $R_1$ and the vibrational backward-moving position $R_2$ is equal to the feed amount (the feed speed) F per revolution, that is 0.10 millimeters. The equation (1) is modified to obtain the amplitude A that is 0.20 millimeters. Therefore, the vibration amplitude-to-feed ratio is 2.0. Further, the phase difference W is a difference t22–t21 between a time t22 at which the vibrational backward-moving position $R_2$ is 0 and a time t21 at which the vibrational forward-moving position $R_1$ is 0. This phase difference W is derived as 2T from the equation (4).

That is, in machining processing from X=10.0 to X=20.0, as compared to the case of machining processing from X=0.0 to X=10.0, the cutting feed speed is doubled, and accordingly the amplitude is also doubled. However, the phase difference W is constant in the case of machining processing from X=10.0 to X=20.0 and in the case of machining processing from X=0.0 to X=10.0. Further, it is understood that when the phase difference W is constant, the vibration amplitude-to-feed ratio Q is also constant. As a result, it is found that even when the phase difference W is designated instead of the vibration amplitude-to-feed ratio Q, processing identical to that in the first embodiment can still be performed.

As described above, in the second embodiment, instead of the vibration amplitude-to-feed ratio Q, the phase difference W is designated in the parameter 431 or the machining program 432 to perform machining. When the phase difference W is constant, the vibration amplitude-to-feed ratio Q is also constant. Therefore, even in the case as described above, effects identical to those in the first embodiment can still be obtained.

In the above descriptions, a movement path in a machining program has been explained. The movement path in a machining program generally shows the locus of the outline of a workpiece when it is machined by the command of the machining program. The workpiece is cut by a tool so as to obtain its outline as described above. However, the locus of the reference position of a tool (for example, the center position of the tool) during movement of the tool relative to the workpiece is different from the above movement path. This is because the reference position of the tool does not match the position of its cutting edge. Therefore, a corrected path can be generated by correcting the above movement path in the machining program so as to be located at the reference position of the tool, and vibrations can be applied to this corrected path. As examples of the correction as described above, a tool-length correction, a wearing-out correction, a nose R correction, a rotating-direction correction, a three-dimensional correction, and a mechanical-error correction can be illustrated.

The first and second embodiments described above can be also applied to drill.

INDUSTRIAL APPLICABILITY

As described above, the numerical control device according to the present invention is suitable for numerical control of a machine tool by using a machining program.

REFERENCE SIGNS LIST 1 numerical control device, 10 drive unit, 11 servo motor, 12 detector, 13 servo control unit, 13X X-axis servo control unit, 13Z Z-axis servo control unit, 14 main-shaft motor, 15 detector, 16 main-shaft control unit, input operation unit, 30 display unit, 40 control computation unit, 41 input control unit, 42 data setting unit, 43 storage unit, 44 screen processing unit, 45 analysis processing unit, 46 mechanical-control-signal processing unit, 47 PLC circuit unit, 48 interpolation processing unit, 49 acceleration-deceleration processing unit, 50 axial-data output unit, 61 workpiece, 62 tool, 201 cutting-feed-speed changing unit, 431 parameter, 432 machining program, 433 screen display data, 434 sharing area, 451 movement-command generation unit, 452 vibration-command analysis unit, 453 vibration amplitude-to-feed ratio analysis unit, 454 phase-difference analysis unit, 481 phase-difference calculation unit, 482 movement-path generation unit, 483 vibration-waveform generation unit, 484 vibrational-movement-amount generation unit, 485 movement-amount combining unit, 4311 vibration amplitude-to-feed ratio, 4312 phase difference.

The invention claimed is:

1. A numerical control device that performs machining on a workpiece while moving a tool and the workpiece relative to each other along a movement path with vibrations by drive shafts with which the tool or the workpiece is provided, the device comprising:

a phase-difference calculator comprising a processor that calculates, as a phase difference, a time lag in a vibrational backward-moving position relative to a vibrational forward-moving position generated based on a command block in a machining program from a ratio between an amplitude of the vibrations and a feed speed of the tool to the workpiece, the ratio being designated for the movement path;

a movement-path generator that generates the vibrational forward-moving position and the vibrational backward-moving position as the movement path for each of the drive shafts based on the phase difference;

a vibrational-movement-amount generator that calculates a vibrational-movement amount on the movement path for each of the drive shafts based on a reference vibration waveform to be superimposed on the movement path; and a movement-amount combiner that generates a combined movement amount for each of the drive shafts by adding the vibrational-movement amount to the movement path.

2. The numerical control device according to claim 1, wherein when the movement-path generator generates movement paths in command blocks different from each other in the machining program, the movement-path generator generates each of the movement paths using the ratio.

3. The numerical control device according to claim 1, further comprising a feed-speed changer that changes the feed speed, wherein the movement-path generator generates the movement path using the ratio and the feed speed changed by the feed-speed changer.

4. The numerical control device according to claim 1, wherein the ratio is set such that, when a first axial position on the movement path at a time when a main shaft that rotates the workpiece is at a predetermined rotation phase and a second axial position on the movement path at a time when the main shaft is at the predetermined rotation phase after rotating by one or more revolutions are compared with each other, the movement path includes a first rotation phase at which the first axial position is located a first distance to a movement start point and a second axial position is located a second distance to the movement start point, the first distance being smaller than the second distance, and further includes a second rotation phase at which the first distance is greater than the second distance, in an advancing direction.

5. A numerical control device that performs machining on a workpiece while moving a tool and the workpiece relative to each other along a movement path with vibrations by drive shafts with which the tool or the workpiece is provided, the device comprising:

a movement-path generator comprising a processor that generates a vibrational forward-moving position, generated based on a command block in a machining program, and a vibrational backward-moving position, obtained by adding a phase difference designated for the movement path to the vibrational forward-moving position, as the movement path for each of the drive shafts;

a vibrational-movement-amount generator that calculates a vibrational-movement amount on the movement path for each of the drive shafts based on a reference vibration waveform to be superimposed on the movement path; and a movement-amount combiner that generates a combined movement amount for each of the drive shafts by adding the vibrational-movement amount to the movement path.

6. The numerical control device according to claim 5, wherein when the movement-path generator generates movement paths in command blocks different from each other in a machining program, the movement-path generator generates each of the movement paths using the phase difference.

7. The numerical control device according to claim 5, further comprising a feed-speed changer that changes a feed speed of the tool to the workpiece, wherein the movement-path generator generates the movement path using the phase difference and the feed speed changed by the feed-speed changer.

8. The numerical control device according to claim 5, wherein the phase difference is set such that, when a first axial position on the movement path at a time when a main shaft that rotates the workpiece is at a predetermined rotation phase and a second axial position on the movement path at a time when the main shaft is at the predetermined rotation phase after rotating by one or more revolutions are compared with each other, the movement path includes a first rotation phase at which the first axial position is located a first distance to a movement start point and a second axial position is located a second distance to the movement start point, the first distance being smaller than the second distance, and further includes a second rotation phase at which the first distance is greater than the second distance, in an advancing direction.

* * * * *